United States Patent [19]
Faulkner et al.

[11] Patent Number: 5,272,556
[45] Date of Patent: * Dec. 21, 1993

[54] OPTICAL NETWORKS

[75] Inventors: David W. Faulkner, Ipswich; Andrew R. J. Cook, Tendring, both of England

[73] Assignee: British Telecommunications, London, Great Britain

[*] Notice: The portion of the term of this patent subsequent to Sep. 14, 2010 has been disclaimed.

[21] Appl. No.: 778,998
[22] PCT Filed: May 25, 1990
[86] PCT No.: PCT/GB90/00827
    § 371 Date: Nov. 14, 1991
    § 102(e) Date: Nov. 14, 1991
[87] PCT Pub. No.: WO90/14734
    PCT Pub. Date: Nov. 29, 1990

[30] Foreign Application Priority Data

May 25, 1989 [GB] United Kingdom ............... 8912012

[51] Int. Cl.$^5$ .............................................. H04J 14/02
[52] U.S. Cl. .............................. 359/125; 359/132; 359/191; 358/86
[58] Field of Search ............... 359/132, 133, 125, 118, 359/190-191; 455/5.1; 358/86

[56] References Cited

U.S. PATENT DOCUMENTS 4,726,010  2/1988  Ali et al. ............................ 359/125
4,783,852  11/1988  Auracher ........................... 359/190

FOREIGN PATENT DOCUMENTS 2181920  4/1987  United Kingdom ............... 359/118

OTHER PUBLICATIONS

ECOC 87, Technical Digest, vol. II, R. Olshansky: "RF multiplexing techniques applied to video distribution in local networks", pp. 122-125.
ECOC 87, Technical Digest, vol. III, C. Baack et al: "Coherent multicarrier techniques in future broadband communication networks", pp. 79-87.
Electronics Letters, vol. 24, No. 22, Oct. 27, 1988 (Stevenage, Herts., GB) W. I. Way et al: "Multichannel FM video transmission using travelling wave laser amplifier in 1300 nm subcarrier multiplexed optical system", pp. 1370-1372.
IEEE Journal on Selected Areas in Communications, vol. 6, No. 7, Aug. 1988, IEEE, (New York, US), R. Kishomoto et al: "Fiber-optic digital video distribution system for high-definition television signals using laser diode optical switch", pp. 1079-1086.
Patent Abstracts of Japan, vol. 9, No. 75 (E-306)(1798), Apr. 4, 1985, and JP. A, 59208952 (Fijitsu K.K.) Nov. 27, 1984.

Primary Examiner—Richard E. Chilcot, Jr.
Assistant Examiner—K. Negash
Attorney, Agent, or Firm—Nixon & Vanderhye

[57] ABSTRACT

A system for distributing HDTV signals from a head station to a number of customer stations includes a single head-end optical source having a frequency $f_0$ and a modulator arranged to receive light from the single optical source. The modulator modulates the light with a sub-carrier multiplex of n channels, where n is an integer greater than 2, the n channels having frequencies $f_1, f_2 \ldots f_n$. The frequencies are separated in frequency-space from each other and from $f_0$. A broadband passive branched optical network is connected to the output of the modulator and arranged to distribute the modulated signal from the head station to a plurality of customer stations each having a coherent heterodyne receiver.

6 Claims, 2 Drawing Sheets

OPTICAL NETWORKS

The present invention relates to optical networks, and particularly but not exclusively to broadband passive optical networks (BPON) for carrying high definition television (HDTV) signals.

It is well known to use a BPON having a branched configuration to convey suitably signals from a head-end station to a number of customer stations. The use of such a system has been proposed for carrying standard definition PAL television. The proposed technical standards for BPONs require a maximum head-end to customer power loss of 26 dB. With a zero dBm launch power, this power budget is adequate to enable up to 32 channels of standard definition PAL to be carried using standard technology. HDTV however requires a far higher bandwidth than conventional television channels and so it is possible to fit only a few channels within the power budget of a conventional BPON. Along with the developments in technical standards associated with the switch from PAL to HDTV there is expected to be a proliferation in the number of channels available to the viewer. Accordingly an optical system capable of carrying fewer than, say, 16 channels is likely to be commercially unacceptable to cable network operators.

There is disclosed in ECOC 87, Technical Digest, vol II, pages 122-125; R. Olshansky: "RF multiplexing techniques applied to video distribution in local networks" a system employing sub-carrier multiplexing in a head station for the distribution of video signals over an optical network.

In the Olshansky system a number of voltage controlled oscillators operating at microwave frequencies are directly frequency modulated. The outputs from the oscillators are combined in a combiner whose output is used to intensity modulate the transmitter laser, and Olshansky refers to wide bandwidth (15 GHz) devices as detectors in the remote terminals. With the Olshansky head-end arrangement, it would not be possible to employ a coherent heterodyne detection system in the customer stations because of a characteristic of the transmission spectrum of such a head-end known by engineers as "chirp".

This problem is avoided in the system of the present invention by the use of the external modulator which receives the light from the head-end laser and modulates it with the transmission signal.

There is known from ECOC 87, Technical Digest, Vol III, pages 79-87; C. Baack et al.: "Coherent multicarrier techniques in future broadband communication networks" a system for providing ISDN services, broadband communication service, video telephone and broadband distribution services such as HDTV to customers via respective single fibres. The head station employs a separate laser for each wavelength to be transmitted onto the fibre network and the customer's station employs heterodyne detection. Upstream transmission from a customer's station is obtained by feeding the output of a separate opto-electronic converter into a fibre coupler in the customer's station and, for each customer, feeding an output from a respective coupler at the head station to a respective opto-electronic converter.

According to the present invention a system for distributing a plurality of channels from a head station to a number of customer stations comprises;

a head station arranged to provide a plurality of output channels at respective frequencies, a plurality of customer stations, and a broadband passive branched optical network coupled to the output of the head station and arranged to distribute the output channels from the head station to the customer stations, each customer station including a coherent receiver having a local oscillator laser and arranged to demodulate a selected one of the channels: characterised in that the head station comprises a head-end optical source having a frequency $f_0$; and an associated modulator arranged to receive light from the optical source and to modulate the light with a sub-carrier multiplex of n channels, where n is a integer greater than 2, the n channels having frequencies $f_1, f_2 \ldots f_n$ separated in frequency-space from each other and from $f_0$, the output of the modulator forming the output of the head station.

The present invention provides a system with a combination of features which together give it a number of significant advantages, particularly for HDTV. The use in a preferred embodiment of a single source and wavelength multiplexing at the head-end in combination with coherent detection at the customer end makes it possible to increase significantly the number of channels which can be encompassed within the limits of the power budget. With the system of the present invention it is not necessary unduly to increase the number of sources used at the head-end, which would add undesirably to the cost and complexity of the head-end, and it may be possible to use only one source. Equally it is not necessary to increase the power of the optical source used: the use of high-power lasers is undesirable since in general they have a higher cost and shorter mean lifetime. Since the system of the present invention uses coherent detection it is possible to use a low-frequency heterodyne receiver at the customer end. The use of such a receiver rather than the broadband envelope detectors commonly used with BPONs leads to improved performance at the customer station. The use of a low-frequency receiver is particularly advantageous in that a much higher sensitivity can be achieved than can be realised using a wideband receiver. With a receiver bandwidth of 30 MHz, the theoretical sensitivity for an amplitude-shift-keyed heterodyne system with sufficient correctly polarised local oscillator power, is approximately −60 dBm. This is approximately 35 dB better than could be achieved by a wideband receiver having the 4 GHZ bandwidth necessary to encompass a typical sixteen channel sub-carrier multiplex of analogue HDTV signals. In practice some of this power advantage is lost by the effective splitting of the transmitter power between the channels, but even so using the system of the present invention a power advantage of the order of 13 dB has been realised. Although in practice this power advantage is found to be most effectively used to enable a reduction in the power of the source and an increase in the number of channels it may in some applications be used alternatively to allow an increase in the number of customers served by one head-end transmitter or to allow the use of other services at different wavelengths on the same network. A further advantage of the system of the present invention is that because each customer station includes its own local oscillator laser the system can readily be adapted to provide a two-way service with upstream data transmission from the customer stations to the head-end in addition to the transmission downstream from the head-end to the receivers.

Preferably each customer station includes frequency control means arranged to control the frequency of the local oscillator laser, a modulator arranged to receive at least a portion of the light output by the local oscillator laser and to modulate the light received from the local oscillator laser with data for transmission upstream to the head-end station, the frequency control means being arranged to select a frequency $f_e$, where $f_e$ is a frequency different from the frequencies $f_1, f_2, \ldots f_n$ of the downstream channels, when data is to be transmitted upstream from the customer stations.

Preferably n is greater than or equal to 16.

Preferably the system includes at least 16 customer stations and the single optical source of the head-end station has an optical power output of substantially 1 mW.

A system in accordance with the present invention will now be described in detail with respect to the accompanying drawings in which.

Figure 1:
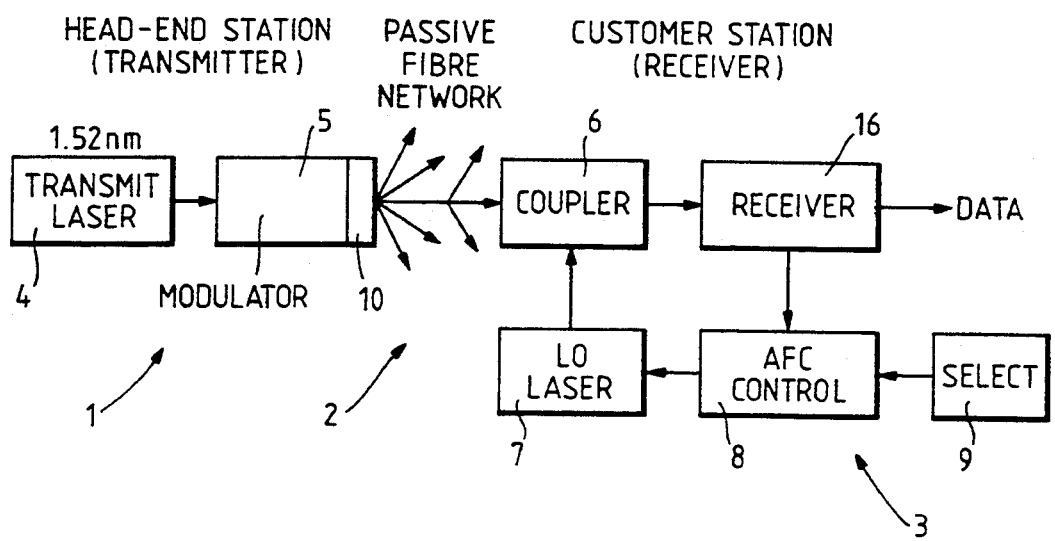
FIG. 1 is a block diagram.

A system for distributing HDTV signals comprises a head-end station 1 connected via a passive branched optical fibre network 2 to a number of customer stations 3. In FIG. 1, for clarity, only a single customer station is shown but in practice 16 or more stations will be connected to a single head-end station. The head-end station 1 includes a single optical source, which in the present example is provided by a distributed feedback laser 4 having an operating wavelength of 1.52 nm and an output power of 1 mW. The output from the laser 4 is fed to an external $LiNBO_3$ modulator 5 where it is intensity-modulated by a sub-carrier multiplex signal as described below. Alternatively a modulator formed from potassium titanyl phosphate (KTP) may be used.

Figure 3:
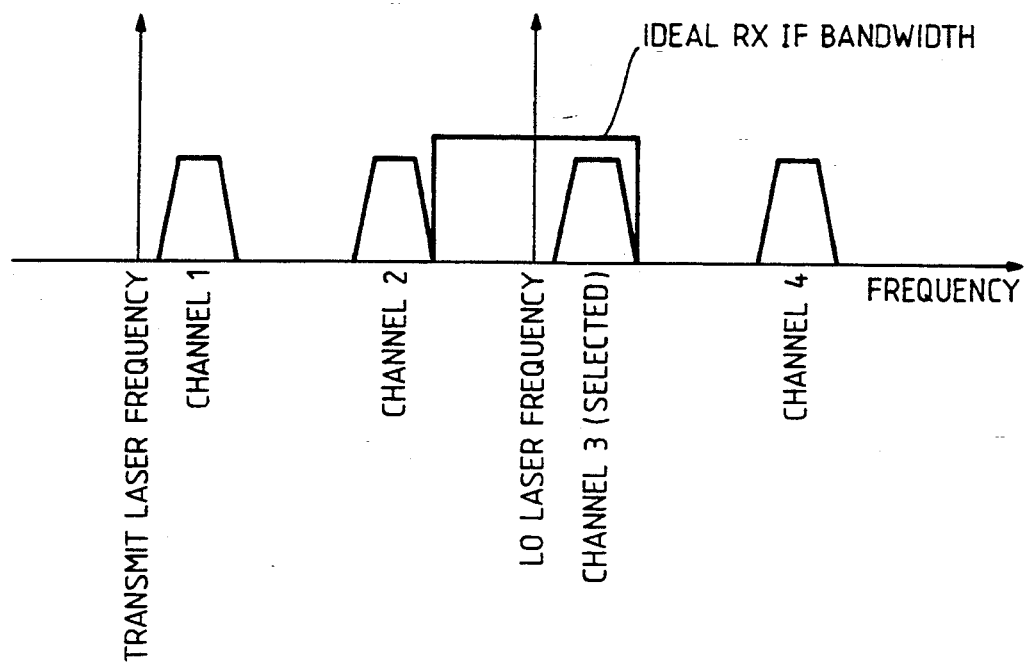
FIG. 3 is a graph showing the spectral positions of frequency components of an HDTV signal.

The amplitude of the optical output from the modulator 5 varies in accordance with the applied modulating signal. Phase or frequency modulation may alternatively be used. In the present example the modulating signal is a sub-carrier multiplex of 16 HDTV channels occupying a total bandwidth of approximately 10 GHZ. Although the channels may be analogue encoded in the preferred example they are digitally encoded with a data rate of the order of 500 Mb/s, in which case the signals are encoded on the carrier from the laser using frequency shift keying. FIG. 3 shows part of the spectrum of the output from the modulator.

The signal from the modulator 5 is coupled to the optical fibre network 2 via a birefringent coupler 10. The network 2 comprises a broadband passive branched optical network using a configuration with a single fibre extending to each customer station and passive splitters or couplers at each node of the network.

Figure 2:
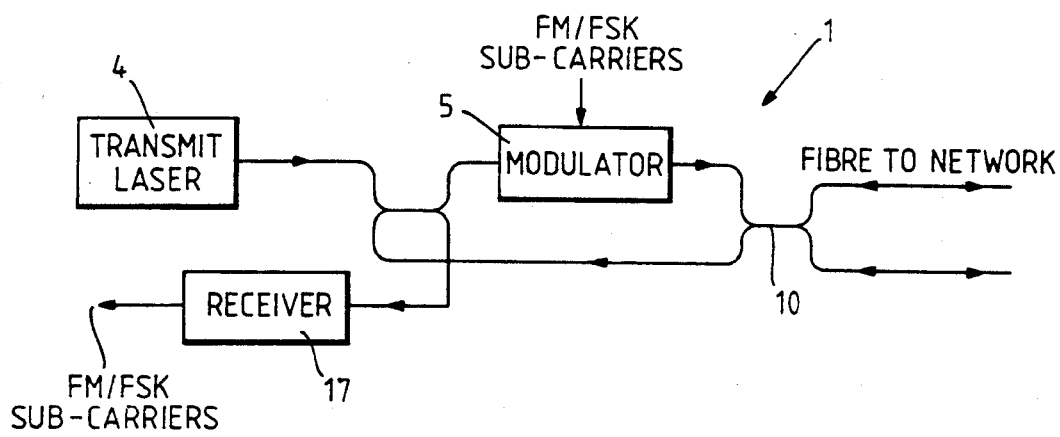
FIG. 2 is a schematic showing the head-end station in greater detail.

In FIG. 2 the coupler 10 is shown as having two output ports connected to two fibres, and may be considered as the first stage of splitting in the branched network. Depending on the coupler construction it may have any convenient number of output ports.

Each customer station 3 includes a receiver employing a coherent heterodyne detection system. The respective arm of the fibre network 2 is fed to a coupler 6 at the input of each receiver. The coupler 6 also receives an optical input from a local oscillator laser 7 which is mixed with the input signal from the network.

The frequency of the local oscillator laser 7 is controlled by an AFC control loop 8 which is in turn controlled by an input from a channel select circuit 9. The AFC control 8 locks the local oscillator laser 7 at a frequency offset from the 1.52 nm carrier frequency by an appropriate amount to select a desired channel. Then When the signal from the local oscillator laser 7 is mixed with the input to the coupler 6 a low-frequency heterodyne output is produced. This output is fed to a low-frequency optical receiver 16 having a bandwidth of approximately 80 MHz for an analogue system or 350 MHz for a digital system. Such an ASK heterodyne system has a theoretical maximum sensitivity of $-60$ dBm and in practice a sensitivity as high as $-50$ dBm can be achieved.

The data output from the receiver may be used to provide feedback to the channel select mechanism, the initial tuning being achieved by looking for an encoded channel identification on the received signals and the lock subsequently being maintained by the AFC loop. The tuning is controlled by varying the drive current to the local oscillator and only a small shift is required to select a given channel.

In the preferred embodiment digital modulation is used and then it is straightforward to provide polarisation independence in the demodulation at the receiver. If however it is required to carry analogue modulated signals on the network then polarisation scrambling is used at the receiver to provide the required polarisation independence. The techniques of polarisation scrambling in coherent detection are described in detail in the paper by T.G. Hodgkinson et al. published at pages 513–514 of Electronics Letters, Vol. 23, No. 10, 7th May 1987.

Figure 4:
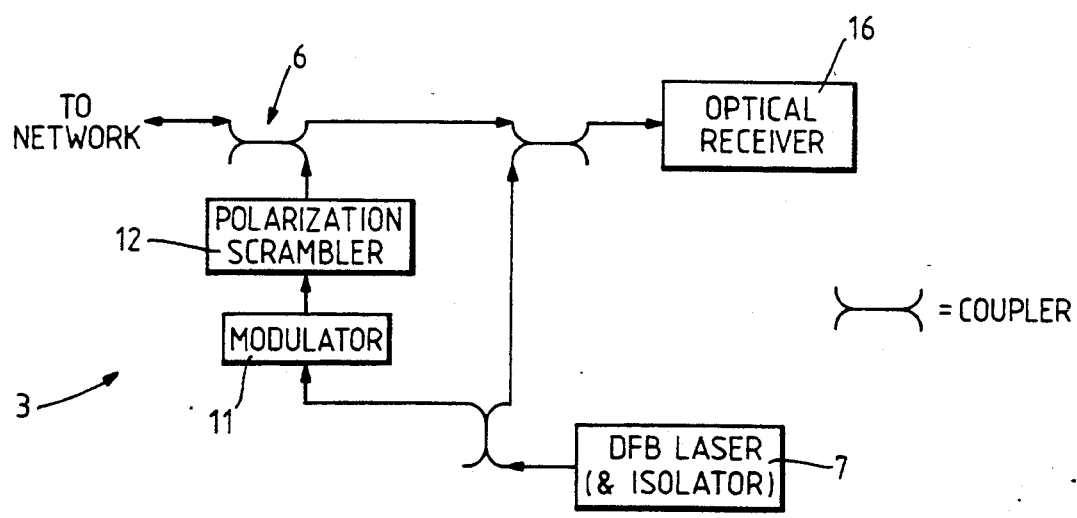
FIG. 4 is a schematic showing a customer station.

Since each receiver includes its own local laser the system can be adapted to provide upstream data transmission from the customer station to the head-end station. As shown in FIG. 4, each customer includes a modulator 11 and polarization scrambler 12 placed in a signal path between its respective laser 7 and the coupler 6 joining the receiver to the network. The head-end station includes a conventional wide-band optical receiver 17 and microwave system. The system for upstream data transmission is described and claimed in our copending application number 8912014. Although, as shown in FIG. 4, the upstream transmissions are conveyed on the same fibre as the downstream transmission, an alternative arrangement would be separate go and return fibres to each customer.

We claim:

1. A system for distributing a plurality of channels from a head station to a number of customer stations comprising:

a head station including a plurality of output channels at respective frequencies, a plurality of customer stations, a broadband passive branched optical network coupled to the output of the head station for distributing the output channels from the head station to the customer stations, each customer station including a coherent receiver having a local oscillator laser to demodulate a selected one of the channels, the head station including a head-end optical source having a frequency $f_0$ and an associated modulator to receive light from the optical source and to modulate the light with a sub-carrier multiplex of n channels, where n is an integer greater than 2, the n channels having frequencies $f_1, f_2 \ldots f_n$ separated in frequency-space from each other and from $f_0$, the output of the modulator forming the output of the head-end station.

2. A system according to claim 1, in which each customer station includes:

frequency control means to control the frequency of the local laser oscillator, and a modulator to receive at least a portion of the light output by the local oscillator laser and to modulate the light received from the local oscillator laser with data for transmission upstream to the head station, the frequency control means selecting a frequency $f_e$, where $f_e$ is a frequency different from the frequencies $f_1, f_2 \ldots f_n$ of the downstream channels, when data is to be transmitted upstream from the customer stations.

3. A system according to claim 2, in which n is greater than or equal to 16.

4. A system according to claim 1, in which the system includes at least 16 customer stations and the optical source of the head station has an optical power output of substantially 1 mW.

5. A system according to claim 1, in which the head station includes a birefringent coupler to couple the output of the modulator to the network.

6. A system according to claim 1, in which the head station includes a further head-end optical source having a frequency $f'_0$, and an associated modulator, the n channels of the corresponding sub-carrier multiplex having frequencies $f'_1, f'_2 \ldots f'_n$ separated in frequency-space from each other and $f'_0$ and from $f_0, f_1, f_n$.

* * * * *